United States Patent [19]

Riecke

[11] 4,040,641
[45] Aug. 9, 1977

[54] TRAILER HITCH COVER

[76] Inventor: Raymond E. Riecke, Box 404, Ruthven, Iowa 51358

[21] Appl. No.: 655,737

[22] Filed: Feb. 6, 1976

[51] Int. Cl.² ............................................. B60D 7/00
[52] U.S. Cl. .................................................. 280/507
[58] Field of Search ......................... 280/507; 138/89

[56] References Cited

U.S. PATENT DOCUMENTS

| | | | |
|---|---|---|---|
| 2,226,233 | 12/1940 | Shapiro | 138/89 |
| 3,271,050 | 8/1966 | Saunders | 280/507 |
| 3,613,936 | 10/1971 | Kaiser | 138/89 |
| 3,782,761 | 1/1974 | Cardin | 280/507 |

Primary Examiner—Robert R. Song

[57] ABSTRACT

A trailer hitch cover is disclosed comprising apparatus for protecting the open end of a tube hitch. The hitch comprises a hollow member such as a square hollow bar extending in back of a vehicle, the tube being adapted to receive an arm from a trailer which fits into the tube and is secured therein by means of a hitch pin that passes through the opening in the tube and the arm. The apparatus of the invention comprises a member having an adjustable extension which may be inserted inside of the tube hitch and projects towards the open end of the tube and to which is secured a plug which seals the end of the tube. The adjustable extension has an opening for receiving the hitch pin and permits the exact positioning of the plug in the end of the tube in order to provide a seal therefore.

3 Claims, 3 Drawing Figures

TRAILER HITCH COVER

SUMMARY OF THE INVENTION

The present invention relates to a tube hitch protecting apparatus comprising a tube insert member for insertion in a tube hitch. A pin receiving member is in the tube insert for securing the tube insert to a tube hitch by means of a pin such as a hitch pin or a bolt or plurality of bolts held in place by means of nuts. An adjustable extension member is secured to and adjustably projects outwardly from the insert. A tube seal member is attached to the extension for sealing the end of the tube hitch when the tube insert is positioned in and secured to a tube hitch through the pin.

In one embodiment the adjustable extension member comprises a threaded shaft threadably engaging the tube insert for moving the extension logitudinally into and out of a tube hitch. A locking member is provided on the threaded shaft for releasably securing the extension to the tube insert. This locking member may comprise lock nuts on the shaft for securing the extension to the tube insert. In the embodiment described, the tube insert comprises a member, the outer walls of which slidably engage the inner wall of a tube hitch, a threaded opening being provided in the tube insert for threadably receiving the shaft. The tube seal comprises a plug insertable in the end of a tube hitch, the periphery of the plug comprising a member for engaging the end of tube hitch such as a flange (plug) arranged around the periphery of the plug.

DETAILED DESCRIPTION

Trailer type vehicles are connected to a towing vehicle such as a tractor or automobile through a hitch, the most common configuration of such hitch comprising a box hitch in which the walls of the tube comprise four flat surfaces intersecting one another at right angles. This type of tubular hitch is adapted to receive an arm which is inserted inside of the hitch and secured thereto by means of a pin or a bolt and nut or plurality of bolts and nuts. When the hitch is not employed in a towing operation, the open end fills with road debris or dirt and makes subsequent insertion of the arm in the hitch difficult.

Hitch covers are known in the prior art as described in U.S. Pat. 3,782,761 Cardin, Sr. The cover of Cardin is unsuitable for use on tubular hitches which have a pin receiving opening in the hitch positioned a distance from the end of the tubular hitch other than that for which the Cardin device is specifically designed. The pin receiving opening on the tubular hitch is employed for holding the hitch box cover of Cardin in place and the positioning of this opening will vary from manufacturer to manufacturer.

U.S. Pat. 3,620,257 Wright, discloses a cover assembly for a clean out pipe and plug projecting outwardly beyond an upright wall surface. The cover assembly is threadably secured to the clean out pipe.

It is therefore an object of the present invention to overcome these and other difficulties encountered in the prior art.

It is a further object of the present invention to provide a tube hitch protecting apparatus comprising a tube hitch cover which is securable to a tube hitch through an opening therein, the opening being adjustably registrable with a pin opening in the tube hitch.

It is a further object of the present invention to provide a tube hitch protecting apparatus in which a tube hitch cover is secured to a member adjustably insertable in a tube hitch.

These and other objects have been achieved by the present invention and will become apparent from the disclosure and claims that follow as well as the appended drawing.

Figure 1:
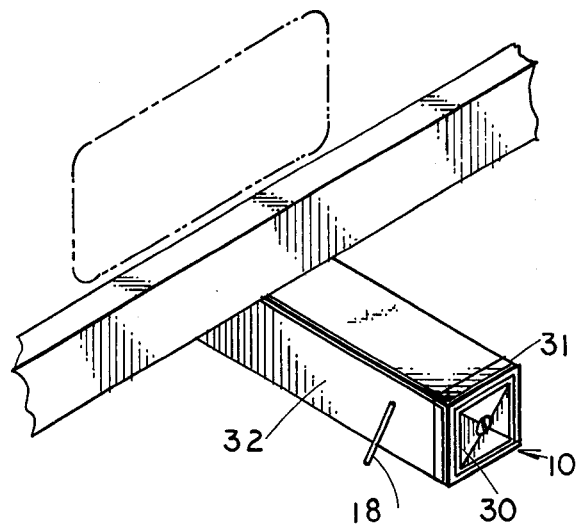
FIG. 1 is a perspective view illustrating a tubular hitch for a trailer having a hitch protecting apparatus or hitch cover according to one embodiment of the present invention.
Figure 2:
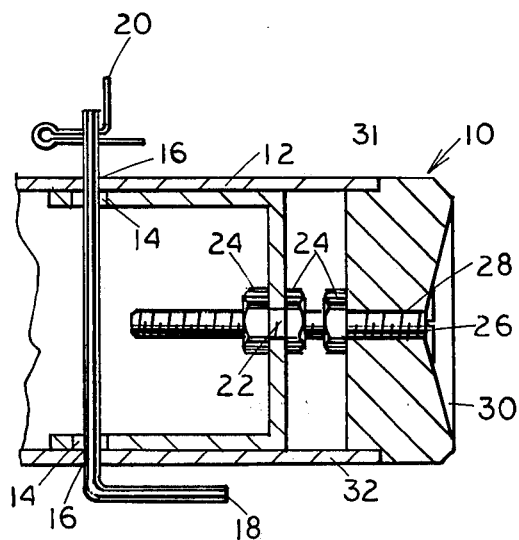
FIG. 2 is a plan view illustrating hitch protecting apparatus according to one embodiment of the invention.
Figure 3:
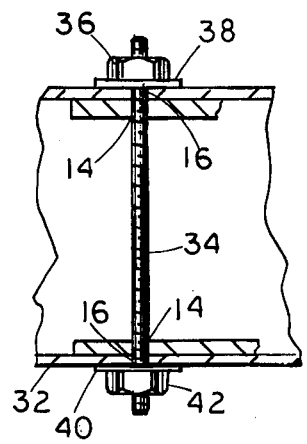
FIG. 3 is a plan view illustrating tubular hitch protecting apparatus according to another embodiment of the present invention in which the apparatus is held in place by means of bolts.

Referring to the drawing and FIGS. 1-3, a hitch protecting apparatus 10 is illustrated comprising a tubular hitch 32 having a tube insert 12 insertable therein, the outer walls of tube insert 12 slidingly engaging the inner walls of tube hitch 32, pin receiving opening 14 in insert 12 being adjustably registrable with pin opening 16 in tube hitch 32 for passing a securing member such as pin 18 lockably insertable through holes 14 and 16 by means of cotter pin 20. Alternately, a bolt 34 having nuts 36 and 42 and washers 38 and 40 mounted thereon may be used for securing insert 12 in tube hitch 32. Insert 12 has an adjustable extension secured to and adjustably projecting outwardly from this insert and comprises a threaded shaft such as a screw 26 passing through opening 28 which secures plug or cover cap 30 to the tubular hitch 32, lock nuts 24 being provided on screw 28 to lock cap 30 a fixed distance from tube insert 12. A flange 31 extends around the periphery of plug 30 to sealingly engage the end of tube hitch 32.

In use, the tube hitch protecting apparatus or cover 10 is positioned in a tubular hitch such as tubular hitch 32 so that the openings 14 in tube insert 12 register with the openings 16 in the tubular hitch 32. The screw 26 is turned to move the cap 30 inwardly or outwardly of the opening at the end of the tubular hitch 32 until the flange 31 seats properly on the end of the tube 32. Lock nuts 24 are then tightened to hold the plug 30 a fixed distance from insert 12 so that plug 30 seals the end of tube 32 when openings 14 and 16 are in registration.

The advantage of employing the tube hitch protecting apparatus 10 of the present invention is that opening 16 on tubular hitch 32 may be positioned in any of a number of places along the length of tube 32 and the hitch protecting apparatus adjusted so that the openings 14 and 16 are registrable. The diameter of the plug 30 may also be in excess of that of the opening in tube 32 so that the apparatus 10 may be employed on a wider tube although in the latter embodiment seating of the plug 30 could not always be obtained in the manner illustrated in the drawing, i.e., by having a flange 31 projecting from the periphery of the plug. The plug 30 may be made of a semi-hard material such as rubber, a thermoplastic material such as polypropylene, hidensity polyethylene and the art known equivalents thereof. The configuration thus described for the tube hitch protecting apparatus makes it universally adoptable to be received in almost all tubular hitch members.

Although the invention has been described by reference to some embodiments, it is not intended that the novel apparatus be limited thereby but that modifications thereof are intended to be included as falling within the broad scope and spirit of the foregoing disclosure, the following claims and the appended drawing.

What is claimed is:

1. Tube hitch protecting apparatus comprising tube insert means for insertion in a tube hitch, said insert means comprising a member, the outer wall of which slidingly engages the inner wall of a tube hitch, first aperture means in said tube insert means for securing said tube insert means to a tube hitch by locking pin means, second aperture means in said tube hitch, said first aperture and said second aperture being alignable for securing said tube insert to a tube hitch by said locking pin means, adjustable extension means comprising threaded shaft means engaging said tube insert means for moving said extension longitudinally into and out of a tube hitch to align said first and second apertures with one another, opening means in said tube insert for receiving said threaded shaft means, said adjustable extension means being secured to and adjustably projecting outwardly from said insert, tube seal means attached to said extension for sealing the end of a tube hitch when said insert means is positioned in and secured to a tube hitch through said first and second aperture means.

2. The apparatus of claim 1 where said tube seal means comprises a plug insertable in the end of a tube hitch, means around the periphery of said plug for engaging the end of a tube hitch.

3. The apparatus of claim 2 where said means around the periphery of said plug comprises flange means.

* * * * *